United States Patent [19]
L'Host

[11] Patent Number: 5,649,671
[45] Date of Patent: Jul. 22, 1997

[54] FISHING REEL WITH INSTANTANEOUSLY DISENGAGEABLE NON-RETURN DEVICE

[75] Inventor: Pierre L'Host, Chatillon Sur Cluses, France

[73] Assignee: Mitchell Sports, Marignier, France

[21] Appl. No.: 488,947

[22] Filed: Jun. 9, 1995

[30] Foreign Application Priority Data

Jun. 9, 1994 [FR] France ................... 94 07398

[51] Int. Cl.⁶ ............................................. A01K 89/027
[52] U.S. Cl. ............................. 242/247; 74/577 M
[58] Field of Search .......................... 242/247, 248; 74/577 M

[56] References Cited

U.S. PATENT DOCUMENTS

| | | | |
|---|---|---|---|
| 4,029,267 | 6/1977 | Slipper | 74/577 M |
| 4,977,795 | 12/1990 | McVey | 74/577 M |
| 5,221,057 | 6/1993 | Yoshikawa. | |
| 5,350,132 | 9/1994 | Hitomi | 242/247 |
| 5,388,777 | 2/1995 | Sugahara | 242/247 |
| 5,458,297 | 10/1995 | Shinohara et al. | 242/247 |

FOREIGN PATENT DOCUMENTS

| | | |
|---|---|---|
| 54-49891 | 4/1979 | Japan. |
| 2 258 595 | 2/1993 | United Kingdom. |

*Primary Examiner*—Katherine Matecki
*Attorney, Agent, or Firm*—Foley & Lardner

[57] ABSTRACT

In a fishing reel with an instantaneously disengageable non-return device, the non-return device has teeth on the inside face of the line recovery device drum. A pawl pivots about an offset spindle on the reel frame and engages with the teeth on the drum in a locked position. A lever pivoting about the main axis of the reel is friction driven by the drum and in turn drives the pawl. The coupling area of the pawl is near the rotation spindle of the pawl and away from the main axis of the reel, so that there is a large multiplication ratio between rotation of the lever and rotation of the pawl. The pawl can therefore be locked to the teeth after imperceptible rotation of the lever and the drum. This achieves an instantaneous non-return function of the drum.

12 Claims, 3 Drawing Sheets

FISHING REEL WITH INSTANTANEOUSLY DISENGAGEABLE NON-RETURN DEVICE

BACKGROUND OF THE INVENTION

1. Field of the invention

The present invention concerns fishing reels of the type with a fixed spool and a rotary line recovery device.

2. Description of the prior art

In a fishing reel of this kind, during line recovery, the spool is prevented from rotating on the main spindle of the reel and a line recovery device including a rotary drum and a bail arm is rotated about the main spindle of the reel by operating a crank handle. The reel frame carries the crank handle and the main spindle of the reel.

The reels usually employed generally comprise a disengageable non-return device which, in a normal position of use, allows rotation of the drum in a line recovery direction and prevents rotation of the drum in the opposite direction. In a disengaged position the device allows the drum to rotate freely in both directions.

Document GB-A-2 258 595 describes one prior art device implementing a disengageable non-return function. This device comprises 15 teeth on the line recovery drum and a single-tooth pawl pivoting about an offset spindle attached to the reel frame. The pawl pivots between a locked position in which it engages the teeth on the drum to prevent it rotating and a released position in which it is moved away from the teeth on the drum to allow it to rotate of that reference. Referring to FIGS. 1 and 2, a rigid lever pivots about the main spindle of the reel frame and is friction driven by the drum which causes it to pivot in one direction or the other, depending on the direction in which the drum itself is rotating, to move it to a first position or to a second position. The lever bears on the pawl, on the opposite side from the part of the pawl which engages with the teeth on the drum, to pivot it between its locked position and its released position against a return spring. The pawl is in the locked position when the lever is in a first extreme position and the pawl is in the released position when the lever is in a second extreme position.

In the embodiment shown in FIG. 5 of document GB-A-2 258 595, the rigid lever is replaced by a spring the end of which engages the pawl on the opposite side to its rotation axis.

FIGS. 2 and 3 appended to this description show another prior art device of a similar kind in which the drum has 20 interior teeth and which also includes a single-tooth pawl and a rigid lever friction driven by the drum. The lever engages with the pawl near the part of the pawl which engages with the teeth on the drum. A two-position adjustable abutment is provided. In its first position it allows the lever to pivot freely between its first and second extreme positions, to implement the non-return function. In its second position it holds the lever in its second extreme position to disengage the non-return device.

In these prior art fishing reels the teeth on the drum comprise at most approximately 20 teeth equiangularly distributed around the inside face of the peripheral wall of the drum. Non-return locking of the drum is effective after the drum has rotated approximately 10°.

Accordingly, the non-return function is not instantaneous, and is effective only after a non-negligible rotation of the drum.

The problem to which the present invention is addressed is that of designing an improvement to disengageable non-return devices which, without increasing the cost, reduces and renders virtually imperceptible the reverse direction rotation of the drum needed to obtain non-return locking.

SUMMARY OF THE INVENTION

To achieve these and other objects, in a fishing reel with disengageable drum non-return device:

a line recovery device drum rotatable about a main axis of a reel frame is provided with teeth, a pawl pivots about an offset rotation spindle attached to said frame between a locked position in which it is engaged with said teeth of said drum to prevent rotation of said drum and a released position in which it is away from said teeth of said drum to allow said drum to rotate, a lever pivots about said main axis of said reel frame and is friction driven by said drum which pivots it in one direction or said other, according to the direction in which said drum itself is rotating, to move it into a first extreme position or a second extreme position, said lever is engaged with a coupling area of said pawl to pivot it between said locked position and said released position, said pawl being in its locked position when said lever is in a first extreme position and said pawl being in its released position when said lever is in a second extreme position, a two-position adjustable abutment, when in its first position, allows said lever to pivot freely between its first and second extreme positions and, when in its second position, holds said lever in its second extreme position to disengage said non-return device, said coupling area of said pawl is near said rotation spindle of said pawl and on the opposite side of said main axis of said reel frame relative to said rotation spindle of said pawl so that there is a large multiplication ratio between rotation of said lever and rotation of said pawl with the result that the rotation required of said drum to move said pawl to said locked position is virtually imperceptible, said teeth on said drum are close together and have a pitch which is less than or equal to the angle through which said drum is required to rotate to move said pawl from said released position to said locked position.

Other objects, features and advantages of the present invention will emerge from the following description of specific embodiments of the invention given with reference to the appended drawings.

DETAILED DESCRIPTION OF THE PREFERRED EMBODIMENT

Figure 1:
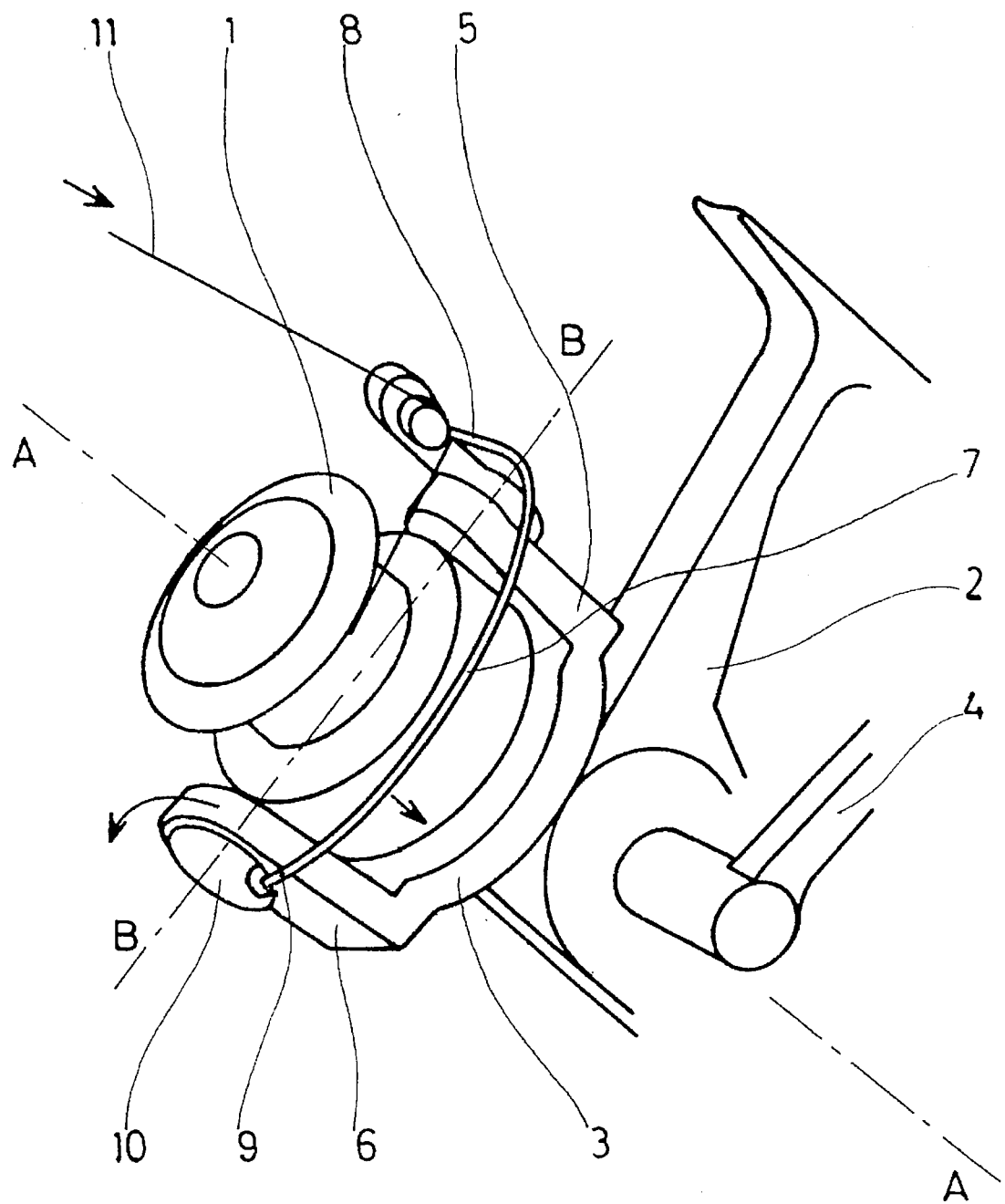
FIG. 1 is a perspective view of a fishing reel with a rotary line recovery device.

FIG. 1 is a perspective view showing the general arrangement of a fishing reel having a fixed spool and a rotary line recovery device.

The spool 1 is prevented from rotating about a main axis A—A on the reel frame 2. A line recovery drum 3 rotates about the main axis A—A of the frame 2 and is rotated by a crank handle 4. The recovery device drum 3 comprises two recovery arms 5 and 6 to the ends of which a recovery device bail arm 7 is articulated. The ends 8 and 9 of the recovery device bail arm 7 are articulated to the arms 5 and 6 by articulations 10 in order to pivot about a transverse axis B—B. In the line recovery position, the recovery device guides the fishing line 11 so that it is wound onto the spool 1 as a result of the rotation of the drum 3 on turning the crank handle 4. A non-return device allows the drum 3 to rotate in the line recovery direction and prevents the drum 3 from rotating in the opposite direction.

Figure 2:
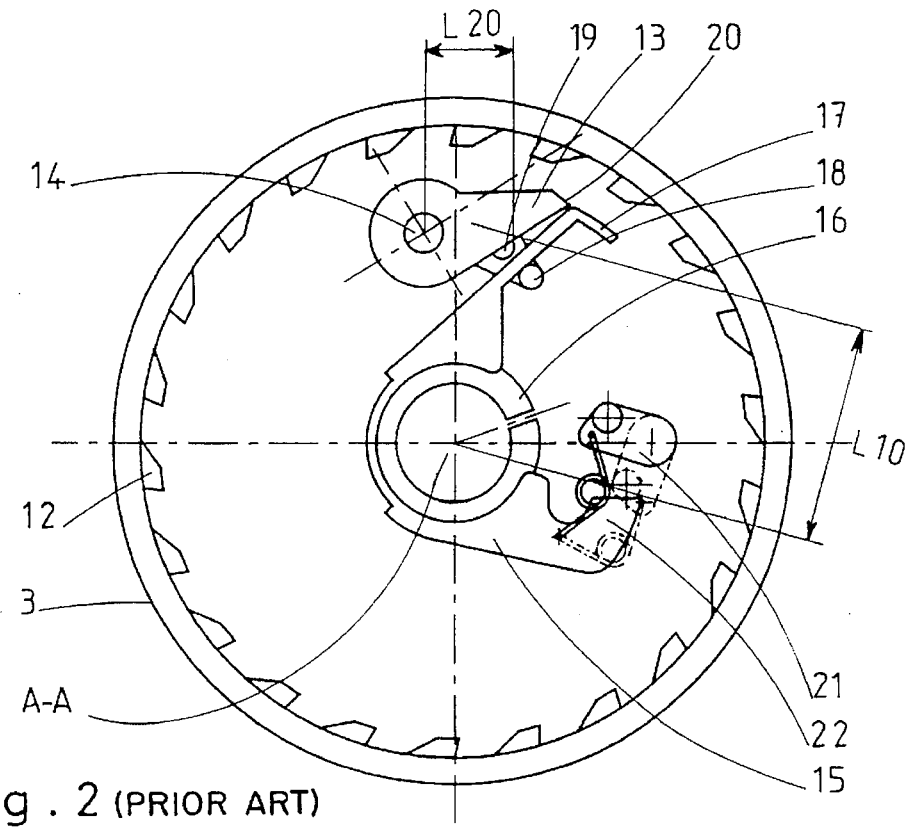
FIG. 2 shows a prior art disengageable non-return mechanism in a released position.
Figure 3:
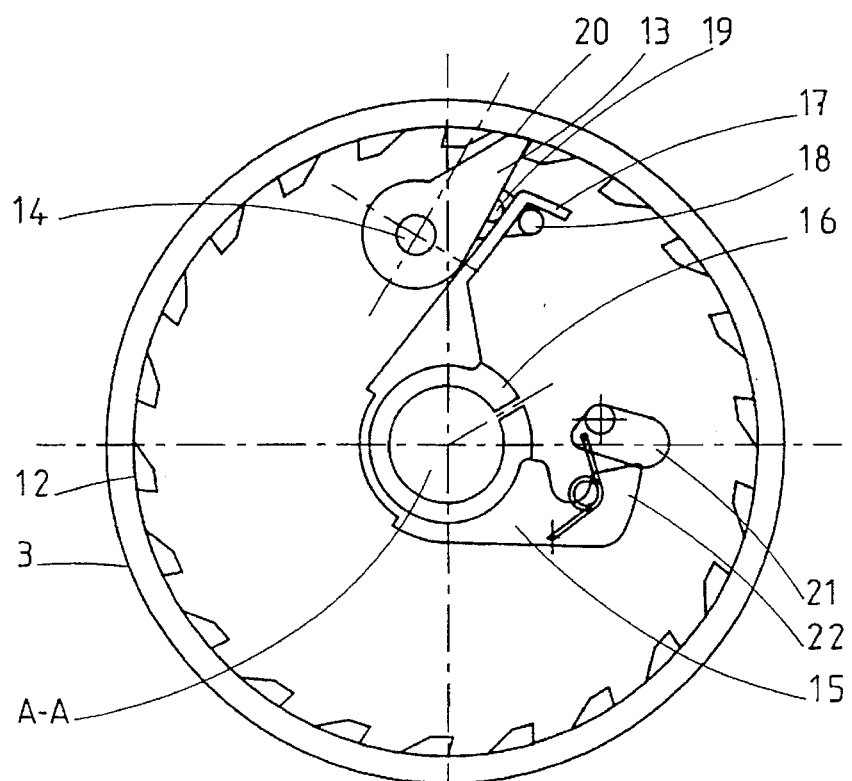
FIG. 3 shows the prior art mechanism from FIG. 2 in a locked position.

FIGS. 2 and 3 show a prior art non-return device. The line recovery device drum 3 has teeth 12 projecting from the inside face of the peripheral cylindrical wall of the drum. A pawl 13 pivots about an offset spindle 14 attached to the frame 2. The pawl 13 can pivot between a locked position shown in FIG. 3 in which it engages the teeth 12 on the drum 3 to prevent rotation of said drum and a released position shown in FIG. 2 in which it is moved away from the teeth 12 on the drum 3 to allow said drum to rotate.

A lever 15 pivots about the main axis A—A of the reel frame 2 and is friction driven by the drum 3 which causes it to pivot in one direction or the other, depending on the direction in which the drum itself is rotating, to move it to a first extreme position or to a second extreme position. FIG. 3 shows the lever 15 in its first extreme position. FIG. 2 shows the lever 15 in its second extreme position.

To enable it to be friction driven by the drum 3, the lever 15 comprises an intermediate area in the form of a split elastic ring 16 engaged elastically around a coaxial cylindrical sleeve attached to the drum 3 (not shown in the figure). By virtue of friction between the split elastic ring 16 and the coaxial sleeve of the drum 3, the lever 15 is friction driven in rotation about the main axis A—A when the drum 3 rotates.

The lever 15 has an end portion 17 engaged between two lugs 18 and 19 on the pawl 13. The lugs 18 and 19 are near the end 20 of the pawl which engages with the teeth 12. Because the end portion 17 of the lever 15 is engaged between the lugs 18 and 19, the lever 15 causes the pawl 13 to pivot between its locked and released positions. The pawl 13 is in the locked position, shown in FIG. 3, when the lever 15 is in its first extreme position. The pawl 13 is in its released position, shown in FIG. 2, when the lever 15 is in its second extreme position.

An adjustable abutment 21 cooperates with the second end 22 of the lever 15. The adjustable abutment 21 assumes one of two positions: in its first position, shown in full line in FIGS. 2 and 3, the abutment 21 allows the lever 15 to pivot freely between its first extreme position (FIG. 3) and its second extreme position (FIG. 2) to implement the non-return function. In its second position, shown in dashed line in FIG. 2, the abutment 21 holds the lever 15 in its second extreme position to disengage the non-return device.

In the prior art device shown in FIGS. 2 and 3 the lever 15 has a medium length lever arm L10 and the pawl 13 has a medium length lever arm L20 substantially equal to half the lever arm L10. Accordingly, rotation of the pawl 13 from its released position to its locked position requires a non-negligible rotation of the lever 15 and of the drum 3 which drives it.

Figure 4:
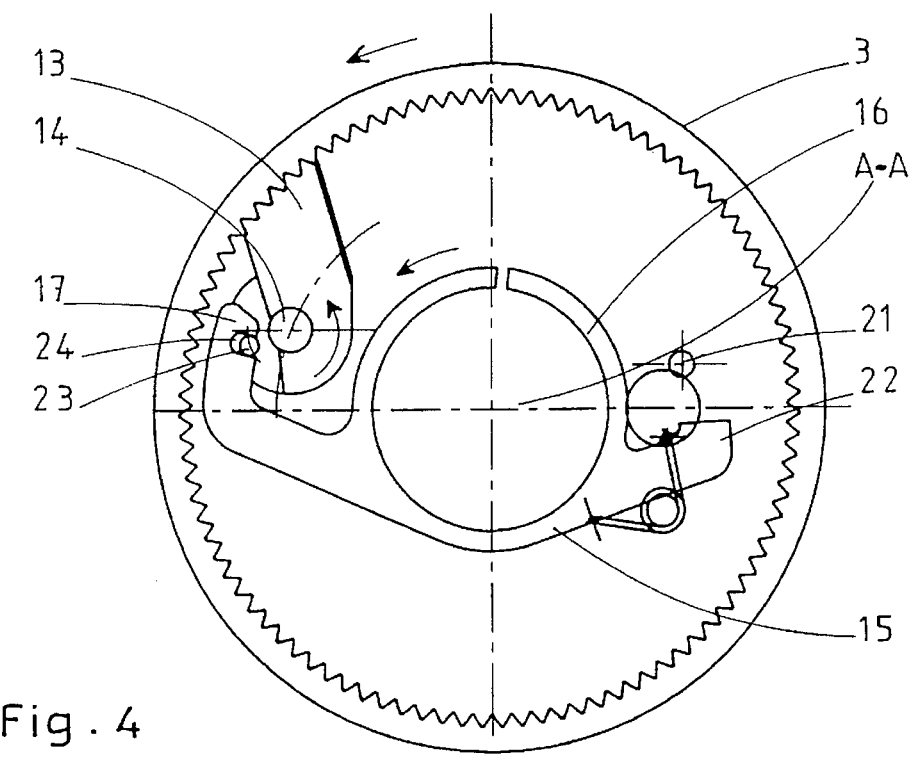
FIG. 4 shows a non-return mechanism of the present invention in a locked position.
Figure 5:
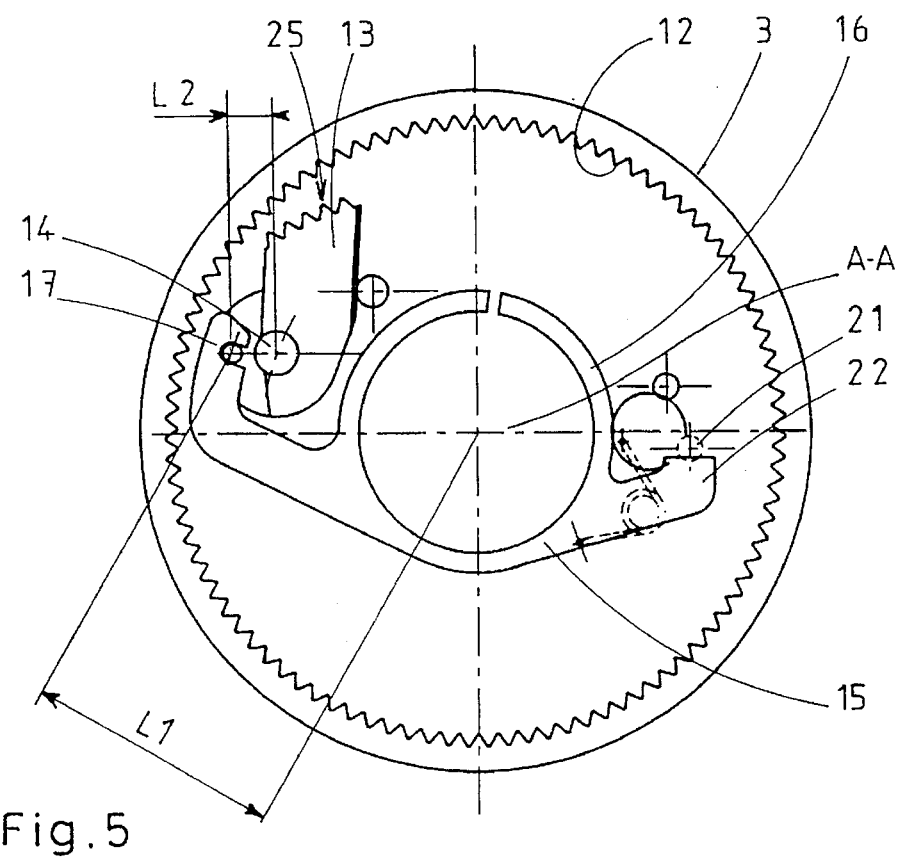
FIG. 5 shows the non-return mechanism from FIG. 4 in a released or disengaged position.

The device of the present invention shown in FIGS. 4 and 5 has the same functional members as the prior art device from FIGS. 2 and 3, except for a different arrangement of the coupling means between the lever 15 and the pawl 13.

Thus it includes the drum 3 with interior teeth 12 rotating about the main axis A—A of the reel. The pawl 13 rotates about the offset spindle 14 attached to the frame 2. The pawl 13 pivots between a locked position, shown in FIG. 4, in which it engages the teeth 12 on the drum 3 and a released position, shown in FIG. 5, in which it is moved away from the teeth 12. The rigid lever 15, pivoting about the main axis A—A of the reel frame, also includes a central portion in the form of a split elastic ring 16 rubbing on a coaxial sleeve attached to the drum 3. A first end 17 of the lever 15 is engaged with a coupling area of the pawl 13. A second end 22 of the lever 15 cooperates with a two-position adjustable abutment 21.

In the embodiment shown in FIGS. 4 and 5 the coupling between the end 17 of the lever 15 and the pawl 13 is provided by a lug 23 on the pawl 13 engaged in a radial notch 24 at the end 17 of the lever 15.

As shown in the figures, the coupling area consisting of the lug 23 and the notch 24 between the pawl 13 and the lever 15 is near the spindle 14 on which the pawl 13 rotates and on the opposite side of the main axis A—A of the reel frame 2 relative to the spindle 14. Because of the proximity of the lug 23 and the spindle 14, the pawl 13 has a short lever arm L2. Because of the specific position of the lug 23 on the opposite side of the main rotation axis A—A relative to the spindle 14 about which the pawl 13 rotates, the lever arm L1 of the lever 15 is maximized. This results in a large multiplication ratio between the rotation of the lever 15 and the rotation of the pawl 13, with the result that the rotation required of the drum 3 to move the pawl 13 to the locked position is virtually imperceptible. In the embodiment shown in the figure, the multiplication ratio is at least 5. By choosing an angular movement of the pawl 13 less than 15° between its locked and released positions, the rotation of the drum 3 to bring about locking is less than 3°. Other values can naturally be chosen using the means of the invention.

As shown in FIGS. 4 and 5, the teeth 12 on the drum 3 are advantageously close together and have a pitch which is less than or equal to the angle through which the drum 3 is required to rotate to move the pawl 13 to the locked position. There are about 100 equi-angularly distributed teeth, for example, representing a pitch of 3.6°, or a greater number of teeth for a smaller pitch. However, to avoid the occurrence of slipping or bouncing phenomena, the size of the teeth, and in particular their depth, must remain greater than a reasonable minimum, with the result that there is an upper limit on their number. A depth of about one millimeter achieves good results.

The teeth 12 on the drum 3 advantageously have flanks inclined at about 45°, as shown in the figures.

The pawl 13 advantageously has an oblique curved end face 25 with a plurality of teeth similar to the teeth 12 on the drum 3. In the embodiment shown in FIGS. 4 and 5 the end face 25 has five teeth, increasing mechanical strength and ruggedness.

Elastic means are preferably provided to press the pawl 13 and the teeth 12 gently into contact. The pawl 13 may include two slightly offset series of parallel teeth, for example, one series comprising rigid teeth for effective locking and the other series comprising elastic material teeth to ensure a gentle first contact on engaging the pawl 13.

When the mobile abutment 21 is in its first position, as shown in full line in FIGS. 4 and 5, the lever 15 can pivot freely between its first extreme position, shown in FIG. 4, and its second extreme position, shown in FIG. 5. Due to rotation of the drum 3, the lever 15 can then pivot and move the pawl 13 into its locked position, shown in FIG. 4, or into its released position, shown in FIG. 5.

When the adjustable abutment 21 is in its second position, shown in dashed line in FIG. 5, it holds the lever 15 in its second extreme position, forcing the pawl 13 into its released position to disengage the non-return device.

The present invention is not limited to the embodiment explicitly described, but includes variants and generalizations thereof contained within the scope of the following claims.

There is claimed:

1. An anti-reverse mechanism for a fishing reel, the reel including a rotating member mounted for rotation about a central axis, the anti-reverse mechanism comprising:

a plurality of teeth arranged circumferentially around a periphery of the rotating member;

a pawl supported for pivotal movement about a second axis located radially outward from the central axis, the pawl including a first interface member situated radially outward of the second axis, the pawl being movable between an engaged position wherein the pawl engages at least one tooth of the plurality of teeth to prevent rotation of the rotating member in a first direction and a disengaged position wherein the pawl is disengaged from the plurality of teeth; and an actuating member, the actuating member being mounted for movement with the rotating member between a first position and a second position, the actuating member including a second interface member in contact with the first interface member, wherein the first and second interface members cooperate to translate movement of the actuating member between the first and second positions into movement of the pawl between the engaged and disengaged positions.

2. The anti-reverse mechanism of claim 1, wherein the first interface member includes a lug and the second interface member includes a notch, the lug being received in the notch at a location radially outward of the second axis.

3. The anti-reverse mechanism of claim 1, further comprising an adjustable abutment arrangement for selectively maintaining the actuating member in the second position and thereby maintaining the pawl in the disengaged position.

4. The anti-reverse mechanism of claim 1, wherein the actuating member is moved with the rotating member by frictional force.

5. An anti-reverse mechanism for a fishing reel, the reel including a rotating member mounted for rotation about a central axis, the anti-reverse mechanism comprising:

a plurality of teeth arranged circumferentially around a periphery of the rotating member;

a pawl supported for pivotal movement about a second axis located radially outward from the central axis, the pawl including a first interface member spaced from the second axis by a first distance, the pawl being movable between an engaged position wherein the pawl engages at least one tooth of the plurality of teeth to prevent rotation of the rotating member in a first direction and a disengaged position wherein the pawl is disengaged from the plurality of teeth; and an actuating member, the actuating member being mounted for pivotal movement with the rotating member about the central axis between a first position and a second position, the actuating member including a second interface member in contact with the first interface member, the second interface member being spaced from the central axis by a second distance at least five times as great as the first distance, wherein the first and second interface members cooperate to translate movement of the actuating member between the first and second positions into movement of the pawl between the engaged and disengaged positions.

6. The anti-reverse mechanism of claim 5, wherein movement of the pawl between the engaged and disengaged positions is less than 15 degrees.

7. The anti-reverse mechanism of claim 5, wherein movement of the pawl between the engaged and disengaged positions results from movement of the rotating member of less than 3 degrees.

8. The anti-reverse mechanism of claim 5, wherein the actuating member is moved with the rotating member by frictional force.

9. The anti-reverse mechanism of claim 5, wherein the first and second interface members are located radially outward of the second axis.

10. An anti-reverse mechanism for a fishing reel, the reel including a rotating member mounted for rotation about a central axis, the anti-reverse mechanism comprising:

a plurality of first teeth arranged circumferentially around a periphery of the rotating member;

a pawl supported for pivotal movement about a second axis located radially outward from the central axis, the pawl including a plurality of second teeth configured to engage the first teeth of the rotating member, the pawl being movable between an engaged position wherein the second teeth engage the first teeth to prevent rotation of the rotating member in a first direction and a disengaged position wherein the pawl is disengaged from the plurality of teeth; and an actuating member, the actuating member cooperating with the pawl to automatically move the pawl between the engaged and disengaged positions;

wherein the pawl includes a first interface member and the actuating member includes a second interface member, the first and second interface members cooperating to translate movement of the actuating member between first and second positions to movement of the pawl between the engaged and disengaged positions; and wherein the first and second interface members are located radially outward of the second axis.

11. The anti-reverse mechanism of claim 10, wherein the plurality of first teeth includes at least 100 equi-angularly distributed teeth.

12. The anti-reverse mechanism of claim 10, wherein the first interface member is spaced from the second axis by a first distance and the second interface member is spaced from the central axis by a second distance at least five times as great as the first distance.

* * * * *